(12) United States Patent
Golan

(10) Patent No.: US 7,328,532 B2
(45) Date of Patent: Feb. 12, 2008

(54) METHOD AND A KIT FOR SHAPING A PORTION OF A WOODY PLANT INTO A DESIRED FORM

(76) Inventor: Ezekiel Golan, 5 Gimmel Kenilat Levov Street, 69703 Tel Aviv (IL)

(*) Notice: Subject to any disclaimer, the term of this patent is extended or adjusted under 35 U.S.C. 154(b) by 71 days.

(21) Appl. No.: 10/963,689

(22) Filed: Oct. 14, 2004

(65) Prior Publication Data

US 2006/0096168 A1    May 11, 2006

(51) Int. Cl.
*A01G 1/06* (2006.01)
*A01G 3/08* (2006.01)
*A01G 23/02* (2006.01)

(52) U.S. Cl. .................... 47/4; 47/32.8; 47/6

(58) Field of Classification Search .............. 47/4, 47/32.7, 32.8, 1.43, 5.5, 6–8, 58.1 R, 62 A, 47/58.1 FV, 32
See application file for complete search history.

(56) References Cited

U.S. PATENT DOCUMENTS

| | | | | |
|---|---|---|---|---|
| 203,545 | A | * | 5/1878 | Jenkins .................. 256/20 |
| 344,885 | A | * | 7/1886 | Viser ..................... 256/20 |
| 1,418,841 | A | * | 6/1922 | Southard ................ 47/32.7 |
| 4,033,072 | A | | 7/1977 | Kobayashi et al. |
| 4,218,847 | A | | 8/1980 | Leroux |
| 4,329,812 | A | * | 5/1982 | Carlisle .................. 47/59 R |
| 4,332,105 | A | | 6/1982 | Nir |
| 4,454,684 | A | | 6/1984 | O'Hare |
| 4,457,102 | A | * | 7/1984 | Ploeger, Jr. ............. 47/58.1 R |
| 4,514,930 | A | | 5/1985 | Schorr et al. |
| 4,756,120 | A | | 7/1988 | Arledge |
| 4,951,416 | A | | 8/1990 | Gutridge |
| 4,986,027 | A | | 1/1991 | Harvey |
| 4,993,184 | A | * | 2/1991 | Howe ..................... 47/4 |
| 5,918,416 | A | | 7/1999 | Ammann, Jr. |
| 5,937,575 | A | | 8/1999 | Zobel et al. |
| 6,862,840 | B1 | * | 3/2005 | Single .................... 47/32.7 |

OTHER PUBLICATIONS

Ficus Root Bonsai & Fuku-Bonsai's Research Philosophy, Jun. 8, 2002. www.fukubonsai.com□□.*
Zobel et al. "Method for Growing Plants Aeroponically", Plant Physiology, 57: 344-346, 1976.
Waisel "Aeroponics: A Tool for Root Research Under Minimal Environmental Restrictions", Tel Aviv University, p. 323-331.

* cited by examiner

*Primary Examiner*—Son T. Nguyen

(57) ABSTRACT

A method of shaping a portion of a woody plant into a desired form is provided. The method is effected by providing a root of a woody plant, shaping the root into the desired form and culturing the root under conditions suitable for secondary thickening of the root.

12 Claims, 6 Drawing Sheets
(5 of 6 Drawing Sheet(s) Filed in Color)

METHOD AND A KIT FOR SHAPING A PORTION OF A WOODY PLANT INTO A DESIRED FORM

FIELD AND BACKGROUND OF THE INVENTION

The present invention relates to a method and a kit for shaping woody plants into a desired form and to products generated therefrom.

The art of shaping living woody plants is known as "arborsculpture", "preaching", "tree trunk topiary", "tree trunk shaping", "botanical architecture", "biotechture" or "permaculture". Presently known living tree configurations include, but are not limited to chairs, tables, benches, entrance arches, tunnels, symbols, fences, bridges, garden rooms and gazebos. The living constructs provide obvious aesthetic and environmental benefits.

Presently, arborsculpture is practiced by manipulating growth of the above-ground tissues (e.g., stem and branches) using traditional horticultural techniques such as pruning, trimming, bending, framing and grafting. The principle methods which are presently used in arborsculpture are described by R. Reames (How to grow a chair: The art of tree trunk topiary, Arborsmith Studios 1607 Cave Camp Road Williams, Oreg. USA, 1995). Accordingly, the process of shaping living woody plants using traditional techniques is very time consuming, excessively laborious and very costly.

Recently, it has been demonstrated that aeroponic chambers can be constructed to accommodate the growth of trees having roots several meters in length (Waisel Y., Aeroponics: a tool for root research under minimal environmental restrictions, pp. 323-331 In: Waisel et al., (eds) Plant Roots, the Hidden Half, $3^{rd}$ Edition, Marcel Dekker Inc, 2002). In aeroponic cultivation, the foliage and root systems of plants are maintained in separate portions of a growth chamber. Accordingly, the foliage is maintained in an illuminated portion of the growth chamber, while the plant roots are suspended in free space in a dark vertically oriented portion of a growth chamber. Water and nutrients are provided upon the bare plant roots by fogging or spraying. Consequently, the plant roots remain free of solid particulates.

While conceptualizing the present invention, the present inventor uncovered that long and flexible tap roots of aeroponically grown trees can be readily shaped into a desired form and cultivated to yield predetermined structures. Furthermore, the root structure retains its designated shape throughout the entire thickening process without the extensive pruning that inherently accompanies state of the art arborsculpture techniques.

The present invention provides novel methods and kits for shaping roots of aeroponically grown woody plants into desired forms conveniently, rapidly and cost-effectively.

SUMMARY OF THE INVENTION

According to one aspect of the present invention there is provided a method of shaping a portion of a woody plant into a desired form. The method includes the steps of (i) providing at least one root of a woody plant, (ii) shaping the at least one root into the desired form and (iii) culturing the at least one root under conditions suitable for secondary thickening of the at least one root.

According to another aspect of the present invention there is provided a kit, including at least one root of an aeroponically grown woody plant and a template for forming the at least one root into a desired shape.

According to yet an additional aspect of the present invention there is provided a living woody plant having a root portion being kept above ground and shaped into an object selected from the group consisting of a chair, a bench, a table, an entrance arch, a tunnel, a symbol, a fence, a bridge, a gazebo and an arbor.

According to still an additional aspect of the present invention there is provided an article-of-manufacture, including at least one root of an aeroponically grown woody plant being shaped into a desired form.

According to further features in preferred embodiments of the invention described below, the woody plant is aeroponically grown.

According to further features in preferred embodiments the shaping of the at least one root is effected by bending, framing, pruning, trimming and/or grafting of the roots.

According to further features in preferred embodiments the culturing is effected by planting the at least one root in soil such that the desired form is kept above ground.

According to still further features in the described preferred embodiments the desired form is a recreational structure.

According to still further features in the described preferred embodiments the recreational structure is selected from the group consisting of a chair, a bench, a table, an entrance arch, a tunnel, a symbol, a fences, a bridge, a gazebo and an arbor.

According to still further features in the described preferred embodiments the desired form is an industrial structure.

According to still further features in the described preferred embodiments the said industrial structure is a two or three dimensional structure used in building construction.

According to still further features in the described preferred embodiments the woody plant is a dicotyledon woody plant.

According to still further features in the described preferred embodiments the dicotyledon woody plant is an ornamental tree.

According to still further features in the described preferred embodiments the ornamental tree is selected from the group consisting of a ficus tree, an alder tree, an ash tree, a sycamore tree, a birch tree, a poplar tree, a maple tree, a locust tree, a redwood tree, a dogwood tree, an eucalyptus tree, a willow tree, an oak tree and a pine tree.

According to still further features in the described preferred embodiments the dicotyledon woody plant is a fruit tree.

According to still further features in the described preferred embodiments the fruit tree is selected from the group consisting of a cherry tree, an apple tree, a pear tree, a plum tree, a nut tree and a citrus tree.

According to still further features in the described preferred embodiments the fruit tree is selected from the group consisting of a cherry tree, an apple tree, a pear tree, a plum tree, a nut tree and a citrus tree.

According to still further features in the described preferred embodiments the shaping is effected by utilizing a template.

According to still further features in the described preferred embodiments the template is a preassembled template.

According to still further features in the described preferred embodiments the kit further including a leaflet of instructions for use of the template for forming said at least one root into the desired shape.

The present invention successfully addresses the shortcomings of the presently known configurations by providing a method for shaping a portion of a woody plant into a desired form which method requires little or no maintenance, while being convenient, rapid and cost effective.

BRIEF DESCRIPTION OF THE DRAWINGS

The file of this patenty contains at least one drawing executed in color photograph. Copies of this patent with color photograph(s) will be provided by the Patent and Trademark Office upon request and payment of necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

Figure 1D:
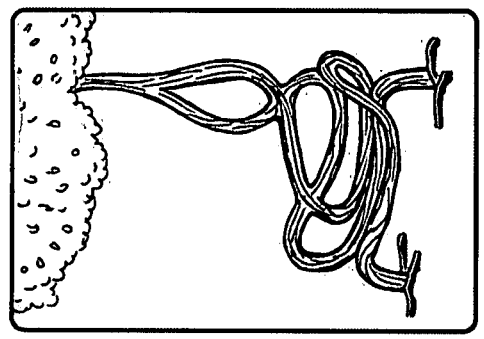
Figure 1C:
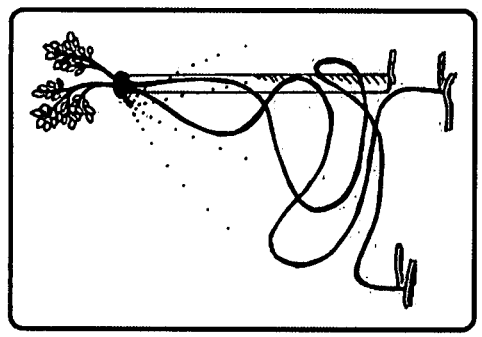
Figure 1B:
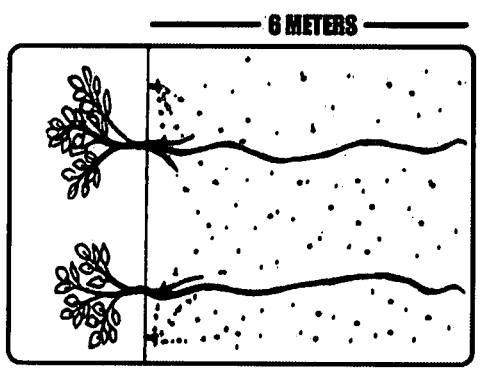
Figure 1A:
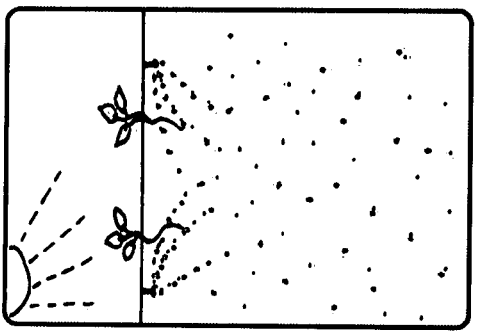

FIGS. 1A-D illustrate the process of shaping a portion of a ficus tree into a bench form according to the method of the present invention. FIG. 1A illustrates a pair of aeroponically grown ficus seedlings. FIG. 1B illustrates a pair of one year-old aeroponically grown ficus trees having long (about 6 m) flexible tap roots. FIG. 3C illustrates roots of a pair of one year-old aeroponically grown ficus trees, being shaped in a bench form and planted in soil such that the bench form is kept above ground. FIG. 3D illustrates the appearance of the living bench following secondary thickening.

Figure 2:
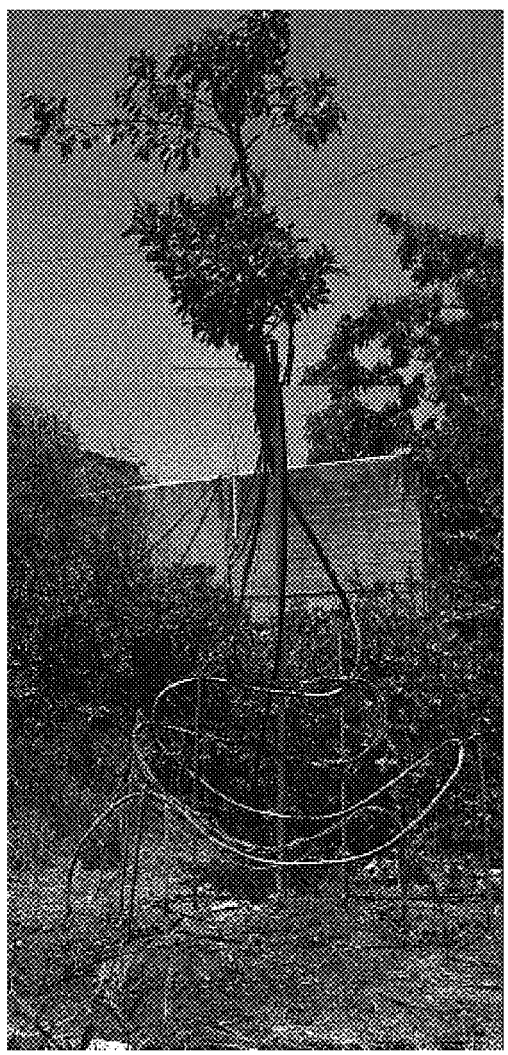

FIG. 2 is a photograph of a living bench made of ficus trees according to the method of the present invention.

Figure 3:
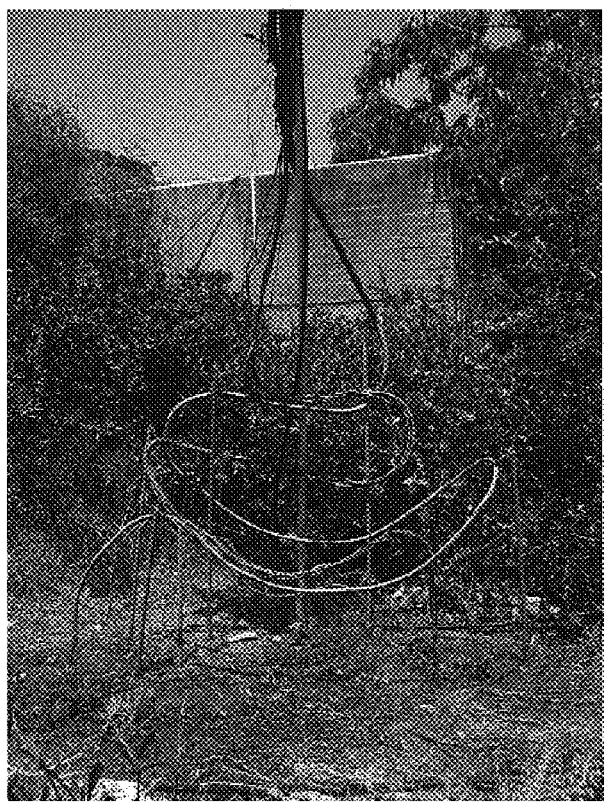

FIG. 3 is a close-up photograph of a bottom portion of the living bench of FIG. 2.

Figure 4:
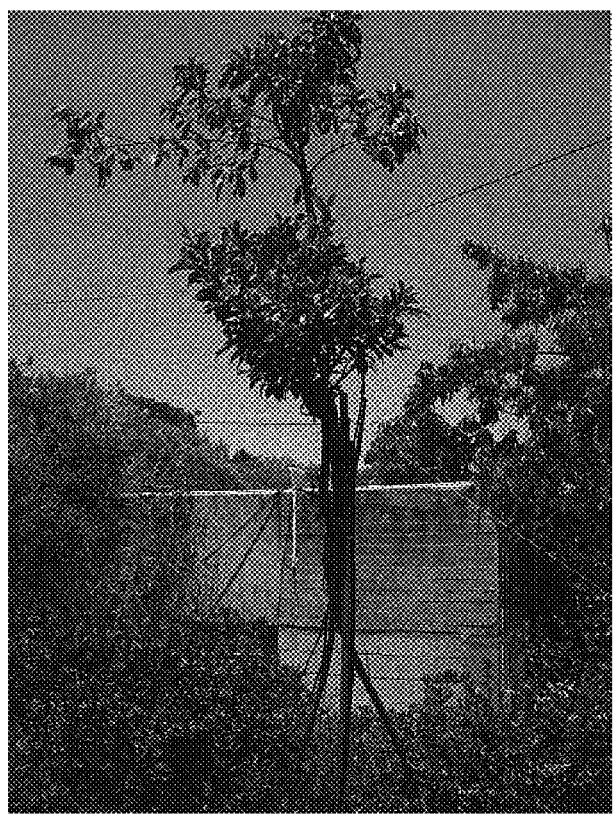

FIG. 4 is close-up photograph of a top portion of the living bench of FIG. 2.

Figure 5:

FIG. 5 is a photograph of tap root systems of aeroponically grown ficus trees.

Figure 6:
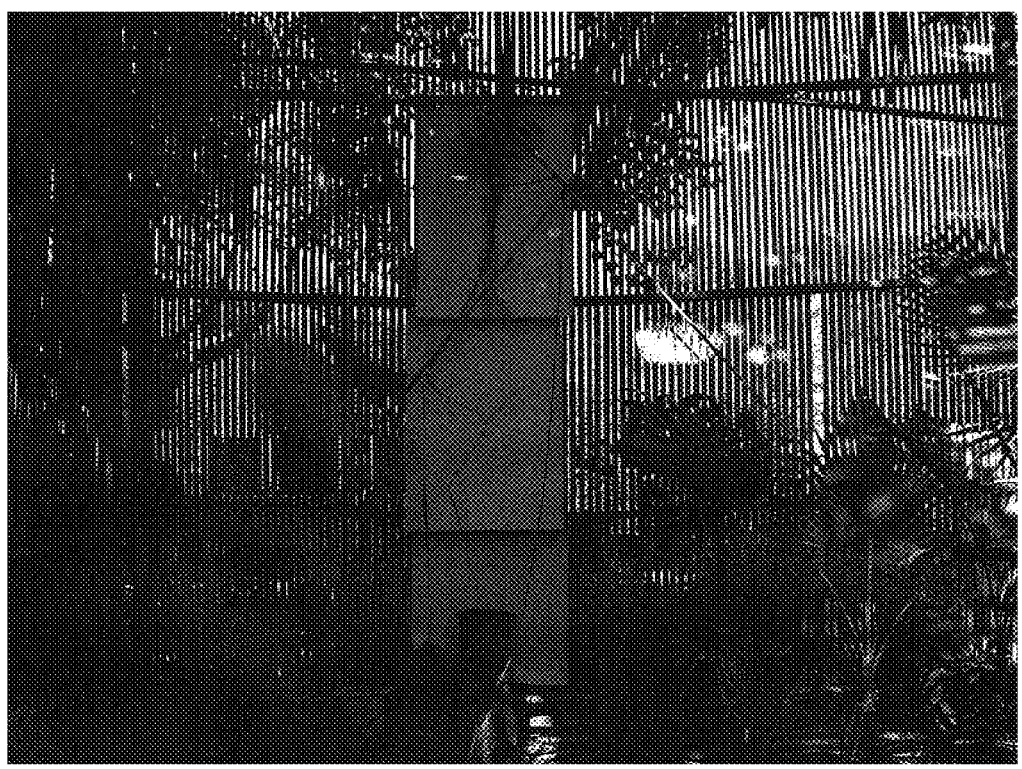

FIG. 6 is a photograph of a ficus tree planted in soil such that a large portion of the root system is kept above ground.

DESCRIPTION OF THE PREFERRED EMBODIMENTS

The present invention is of a method and a kit for shaping a portion of a woody plant into a desired form and products generated from such woody plants.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The shaping of woody plants is presently limited to treating the above ground tissues (e.g., stems and branches) only, as described in the background section hereinabove. Consequently, the process of forming a desired shape of woody plants is presently very long, time consuming, excessively laborious and costly.

While reducing the present invention to practice the present inventor uncovered that one year old aeroponically grown *Ficus nitida* trees are capable of supporting long (about six meter) and flexible tap roots which could be readily and conveniently shaped, via bending and grafting, into a desired (bench) form (FIG. 5). Accordingly, bench shaped roots of a pair of aeroponically grown one year old ficus trees were planted in soil keeping the bench form above ground, thereby enabling secondary thickening of the bench forming tissues (FIGS. 1A-C, 2, 3 and 6). Once secondary thickening initiates, in time the living bench becomes strong enough to support people (FIG. 1D; see Example 1 hereinbelow).

Thus, according to one aspect of the present invention there is provided a method of shaping a portion of a living woody plant into a desired form. The method includes: (i) providing one or more roots of a woody plant, (ii) shaping the roots into the desired form and (iii) culturing the roots under conditions suitable for inducing secondary thickening of the roots.

As used herein the phrase "woody plants" refers to any perennial plant capable of developing a hard lignified tissue, preferably a dicotyledon tree. A suitable tree can be a fruit tree such as, for example, cherry, apple, pear, plum, nut or citrus, most preferably species of the genera *Prunus, Ficus* or *Citrus*. Alternatively, a suitable tree can be an ornamental tree such as, for example, ficus, alder, ash, sycamore, birch, poplar, maple, locust, redwood, dogwood, eucalyptus, willow, oak or pine, more preferably species of the genera *Ficus, Clusia, Acer, Pinus, Abies, Quercus, Acacia* or *Eucalyptus*, most preferably species of *Ficus*.

Suitable woody plants may also be hemiepiphyte trees (i.e., capable of deriving moisture from the air during an early growth stage) such as, for example species of the genera *Clusia* and strangler figs.

Suitable woody plant root or roots are preferably provided free of solid particulate, such as roots of hydroponically grown or, most preferably, aeroponically grown woody plants.

Aeroponic culturing can be effected by inserting seeds, seedlings or cuttings of the woody plant in a suitable aeroponic system such that roots are suspended in a dark chamber, while the foliage tissues are maintained in an illuminated chamber. The root chamber is misted or sprayed with a nutrient solution at certain intervals and remains at close to 100% humidity, thereby enabling the roots to absorb the nutrients in the presence of air. Examples of suitable aeroponic systems are described in U.S. Pat. Nos. 4,332,105, 4,514,930, 5,918,416 and 5,937,575 and by Zobel et al. (Plant Physiology 57: 344-346, 1976) and Waisel et al. (pp. 323-331 In: Plant Roots, the Hidden Half, $3^{rd}$ Edition, Marcel Dekker Inc, 2002).

Conditions suitable for aeroponically growing tap roots of *Ficus nitida* are provided in Example 1 hereinbelow.

Although presently not preferred, suitable woody plant roots may also be provided via hydroponic culturing. Hydroponic culturing can be effected by growing the plant in a soilless medium wherein water and nutrients are supplied by wetting the plant roots with an appropriate aerated nutrient solution. Thus, the plant roots can be directly immersed in the nutrient solution or wetted in a porous inert aggregate material such as sand, gravel, vermiculite, expanded mica, crushed stone, cinders, bricks, glass beads, ground lava and the like and within which aggregate material the plant roots reside. Examples of suitable hydroponic systems and growth conditions are described in J. Benton Jones, Jr. (Ed.) "A Practical Guide for the Soilless Grower", Saint Lucie Press, 1997; and in U.S. Pat. Nos. 4,033,072, 4,218,847, 4,454, 684, 4,756,120, 4,951,416 and 4,986,027.

Once reaching the desired length, flexible (e.g., non-lignified) roots of one or more aeroponically or hydroponically grown plants can be shaped into a desired form, preferably a recreational or industrial structure.

A suitable recreational structure can be, for example, a chair, a bench, a table, an entrance arch, a tunnel, a symbol, a fence, a bridge, a gazebo, a children's play structure, a spectator seat for a sports field, a skypath or an arbor. Most preferably, the recreational structure is a bench.

A suitable industrial structure can be any structure which has an industrial utility and, is preferably, commercially advantageous. For example, a two or three dimensional structure intended for use in building constructions (e.g., window and door frames, boxes, compartments, stairs, ladders, suspension beams and pillars etc.) can be made substantially more flexible than comparable structures which are manufactured artificially. Such naturally shaped woody constructs are particularly advantageous for use in buildings fabricated in earth-quake prone locations (for example, California and Japan). The theory pertaining to the structural superiority of plant tissues is elaborated in K. J. Niklas "Plant Biomechanics—An engineering approach to plant form and function", University of Chicago Press, 1992.

Additional structures that can be generated using the teachings of the present invention include, but are not limited to, a barn, a silo, a feed store, a hay store, a pen, a coop, a stable, a greenhouse, a darkhouse, a bridge, a fence or separator, a boat ramp, a dock, a hangar or a garage. Structures fabricated by the method of the present invention advantageously requires extremely low maintenance costs since the living trees from which they are constructed are self repairing (if damaged), self adjusting (if subject to slow earth movements or strong unidirectional winds) and are perpetually growing. Consequently, the structures actually become stronger over time, even if not cared for.

Another advantage of the structures of the present invention is that they blend naturally with the environment, both esthetically and ecologically. In addition, the fact that most of the structure mass is obtained during the secondary thickening stage via photosynthesis, facilitates transport of "building material" (i.e., the unthickened root) making the present method highly suitable for construction in places that are hard to reach (e.g. swamps, jungles, cliff faces, off road sites). This can be extremely labor-saving for projects that necessitate the construction of canopy skypaths or cranes for ecological canopy research, or cost saving for gorge crossing necessitated by research or recreational wilderness paths.

The shaping of roots can be effected using standard horticultural techniques well known in the art such as, for example, bending, trimming, pruning, grafting and/or framing. Preferably the shaping is effected by using a template of the desired form.

In order to enable the end user to conveniently and rapidly shape a portion of a woody plant into a desired form, without requiring an access to an aeroponics facility, the roots of aeroponically grown woody plants can be provided as a user friendly kit.

Thus, according to another aspect of the present invention there is provided a kit including roots of one or more aeroponically grown woody plants and a template for shaping the roots into a desired form.

As used herein, the term "template" refers to a mechanical pattern/structure used to guide and/or support the shaping of the plant roots. A suitable template may include prefabricated or modular units and is preferably provided preassembled in order to reduce shipping size.

Roots of aeroponically grown woody plants are preferably contained in moisture-holding packaging material capable of keeping the plants viable for at least 3 days, such as being commercially used for shipping cut flowers or bare-root seedling transplants (see, for example, in www.intracen.org/ep/welcome2.htm?http&&&; www.intracen.org/ep/packit/cutflow.htm; or www.convex.co.nz/prod_refresh_pkg_cutflower.html). Preferably, the kit further includes instructions for use provided as a leaflet or as an instructional video.

Alternatively, woody plants with roots being at least 3 meters long, preferably at least 4 meters long, more preferably at least 5 meters long, still preferably at least 6 meters long, more preferably at least 7 meters long, still more preferably at least 8 meters long, still preferably at least 9 meters long, preferably at least 10 meters long, more preferably at least 11 meters long, preferably at least 15-25 meters long or more can be packaged in a moisture-holding packaging material capable of keeping the plants viable for at least 3 days, or have their roots rolled over a roller with provision of humidity for shipment. Preferably, the roots are free of solid particulates (e.g., aeroponically or hydroponically grown plants).

Following shaping, the roots are cultured under conditions suitable for secondary thickening of the roots. Such culturing can be effected under controlled laboratory conditions (e.g., aeroponic growth) or, more preferably, by planting the roots in soil such that the desired form is kept above ground.

As is mentioned hereinabove, following a period of secondary thickening the desired form shaped from the root can be utilized for its intended recreation purpose, or be harvested and utilized for its intended industrial purpose.

Additional objects, advantages, and novel features of the present invention will become apparent to one ordinarily skilled in the art upon examination of the following example, which is not intended to be limiting. Additionally, each of the various embodiments and aspects of the present invention as delineated hereinabove and as claimed in the claims section below finds experimental support in the following example.

EXAMPLE

Reference is now made to the following example, which together with the above descriptions, illustrates the invention in a non limiting fashion.

Example 1

Fabricating a Living Bench from *Ficus* trees

Nursery grown seedlings: One year old potted (nursery-grown) *Ficus nitida* seedlings where removed from pots and their roots were washed by a gentle stream of tap water (at about 1 atm, adjusted manually such as to avoid damaging the root system) to remove any soil or clinging particles. Few soil particles which were securely fastened by the root system were left intact. In addition, about half of the seedlings foliage was pruned to reduce dehydration.

Selfgrown seedlings: *Ficus nitida* seeds were collected from fruit and were thoroughly rinsed in water to wash off any excess pulp. The washed seeds were planted in an inert growth medium and kept at 25° C. and 100% humidity conditions until germination occurred (within one week). The germinated seedling were transferred to an aerated chamber and grown for two months at 25° C. while being provided with a nutrient solution (0.075% 20-20-20 nutrient solution; Haifa Fertilizers & Chemicals, Israel) every two days. The seedlings were then removed from culture medium and their roots were washed by a gentle stream of tap water (at about 0.5 atm, adjusted manually to avoid damaging the roots) to remove any excess medium. The washed seedling roots were wrapped in moistened cotton to reduce dehydration and to add girth.

Aeroponic culturing: *Ficus* seedlings (both nursery-grown and self grown) were cultured in a large aeromponic facility (Sarah Racine Root Research Laboratory, Tel Aviv University) under conditions as described in Waisel et al. (pp. 327-328 In: Plant Roots, the Hidden Half, $3^{rd}$ Edition, Marcel Dekker Inc, 2002). The seedlings were misted with a nutrient solution [20-20-20 fertilizer (Haifa Fertilizers & Chemicals, Israel), 75 gr; $MgSO_4.7H_2O$ (Frutarom Ltd.), 13.5 gr; and $CaCl_2.2H_2O$ (Frutarom Ltd.), 11 gr in 100 liters of water].

Shaping a living bench: One year old aeroponically grown *Ficus nitida* plants exhibited long (about six meter) and flexible tap roots (FIGS. 1A-B, 5). The roots of a pair of such aeroponically grown *Ficus nitida* plants where shaped, via bending and grafting, into a bench form and planted in soil, while keeping the bench form above ground (FIGS. 1C, 2, 3 and 6). Following a few years of secondary thickening the living bench became strong enough to support people (FIG. 1D).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, patent applications mentioned in this specification are herein incorporated in their entirety by reference into the specification, to the same extent as if each individual publication, patent, patent application was specifically and individually indicated to be incorporated herein by reference. In addition, citation or identification of any reference in this application shall not be construed as an admission that such reference is available as prior art to the present invention.

What is claimed is:

1. A method of shaping a portion of a woody plant into a desired form, comprising:
   (a) providing at least one aeroponically grown unlignified tap root of a woody plant, wherein said tap root is at least 3 meters long;
   (b) shaping said at least one unlignified tap root into the desired form; and
   (c) culturing said at least one unlignified tap root under conditions suitable for secondary thickening of said at least one unlignified tap root, thereby shaping the portion of the woody plant into the desired form.

2. The method of claim 1, wherein said shaping is effected by bending, framing, pruning, trimming and/or grafting of said roots.

3. The method of claim 1, wherein said culturing is effected by planting said at least one root in soil such that the desired form is kept above ground.

4. The method of claim 1, wherein said desired form is a recreational structure.

5. The method of claim 1, wherein said recreational structure is selected from the group consisting of a chair, a bench, a table, an entrance arch, a tunnel, a symbol, a fence, a bridge, a gazebo and an arbor.

6. The method of claim 1, wherein said desired form is an industrial structure.

7. The method of claim 1, wherein said industrial structure is a two or three dimensional structure used in building construction.

8. The method of claim 1, wherein said woody plant is a dicotyledon woody plant.

9. The method of claim 8, wherein said dicotyledon woody plant is an ornamental tree.

10. The method of claim 9, wherein said ornamental tree is selected from the group consisting of a ficus tree, an alder tree, an ash tree, a sycamore tree, a birch tree, a poplar tree, a maple tree, a locust tree, a redwood tree, a dogwood tree, an eucalyptus tree, a willow tree, an oak tree and a pine tree.

11. The method of claim 1, wherein said shaping is effected by utilizing a template.

12. The method of claim 1, wherein said at least one unlignified tap root is at least 4 meters long, up to 25 meters long.

* * * * *

UNITED STATES PATENT AND TRADEMARK OFFICE
CERTIFICATE OF CORRECTION

PATENT NO. : 7,328,532 B2  Page 1 of 1
APPLICATION NO. : 10/963689
DATED : February 12, 2008
INVENTOR(S) : Ezekiel Golan It is certified that error appears in the above-identified patent and that said Letters Patent is hereby corrected as shown below:

In the claims:

On Page 11, Column 8, please correct Claim 5 as follows:

claim "1" to claim --4--

On Page 11, Column 8, please correct Claim 7 as follows:

claim "1" to claim --6--

Signed and Sealed this
Third Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,328,532 B2 | Page 1 of 1 |
| APPLICATION NO. | : 10/963689 | |
| DATED | : February 12, 2008 | |
| INVENTOR(S) | : Ezekiel Golan | |

It is certified that error appears in the above-identified patent and that said Letters Patent is hereby corrected as shown below:

In the claims:

Column 8, line 29, please correct Claim 5 as follows:

claim "1" to claim --4--

Column 8, line 35, please correct Claim 7 as follows:

claim "1" to claim --6--

This certificate supersedes the Certificate of Correction issued May 3, 2011.

Signed and Sealed this
Thirty-first Day of May, 2011

David J. Kappos
*Director of the United States Patent and Trademark Office*